United States Patent
Di Simone

(10) Patent No.: US 8,328,546 B2
(45) Date of Patent: Dec. 11, 2012

(54) AUXILIARY INJECTION UNIT INTEGRATED IN INJECTION MOLDING SYSTEM

(75) Inventor: John Di Simone, Woodbridge (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 158 days.

(21) Appl. No.: 12/825,870

(22) Filed: Jun. 29, 2010

(65) Prior Publication Data

US 2011/0316191 A1    Dec. 29, 2011

(51) Int. Cl.
*B29C 45/47* (2006.01)
*B29C 45/62* (2006.01)

(52) U.S. Cl. ......... 425/130; 425/190; 425/567; 425/587

(58) Field of Classification Search .................. 425/190, 425/134, 130, 225, 567, 587; 264/328.1, 264/255, 39
See application file for complete search history.

(56) References Cited

U.S. PATENT DOCUMENTS

| | | | |
|---|---|---|---|
| 2,950,501 A | 8/1960 | Harkenrider | |
| 3,429,007 A * | 2/1969 | Aoki | ............... 425/119 |
| 3,550,207 A * | 12/1970 | Strauss | ......... 425/156 |
| 3,647,338 A * | 3/1972 | Ise | ............. 425/567 |
| 3,809,519 A | 5/1974 | Garner | |
| 4,140,238 A | 2/1979 | Dawson | |
| 4,416,602 A | 11/1983 | Neumeister | |
| 4,966,545 A | 10/1990 | Brown et al. | |
| 5,017,127 A | 5/1991 | Majerus et al. | |
| 5,407,342 A | 4/1995 | Boucher et al. | |
| 5,494,632 A | 2/1996 | Glaser et al. | |
| RE35,256 E | 5/1996 | Von Buren | |
| 5,605,707 A | 2/1997 | Ibar | |
| 5,616,350 A * | 4/1997 | Wissmann et al. | ........ 425/133.1 |
| 5,814,358 A | 9/1998 | Bock | |
| 6,196,822 B1 | 3/2001 | Blundy | |

(Continued)

FOREIGN PATENT DOCUMENTS

CN    101310960    11/2008

(Continued)

OTHER PUBLICATIONS

"International Search Report and Written Opinion", Int'l Appl. No. PCT/CA2011/050392, (Aug. 19, 2011).

*Primary Examiner* — Jill Heitbrink
(74) *Attorney, Agent, or Firm* — Medler Ferro PLLC

(57) ABSTRACT

An auxiliary injection unit is disclosed that has an extruder barrel and extruder screw integrated within an injection molding system. The extruder barrel and extruder screw are contained within a mold plate of the injection molding system with a drive mechanism of the auxiliary injection unit being external thereof. A melt stream emanating from the extruder barrel of the auxiliary injection unit is in selective fluid communication with either a melt channel of a manifold providing melt thereto during an injection cycle or with a discharge channel of a melt discharge tube for purging melt. A melt diverter component receives the melt stream from the extruder barrel and includes a shuttle valve slidably positioned therein that is operated to selectively divert the melt stream produced by the auxiliary injection unit to either the melt channel of the manifold or the discharge channel of the discharge tube.

19 Claims, 10 Drawing Sheets

U.S. PATENT DOCUMENTS

| | | |
|---|---|---|
| 6,419,869 B1 | 7/2002 | Gotterbauer et al. |
| 6,450,794 B1 | 9/2002 | Orru' |
| 6,604,936 B2 | 8/2003 | Boyd |
| 6,676,541 B2 | 1/2004 | Cavallaro et al. |
| 7,005,098 B2 | 2/2006 | Cavallaro et al. |
| 7,284,979 B2 | 10/2007 | Mai |
| 7,351,166 B2 | 4/2008 | Cavallaro et al. |
| 7,393,479 B2 | 7/2008 | Mai |
| 7,462,314 B2 | 12/2008 | Feick |
| 7,484,948 B2 | 2/2009 | Wimberger |
| 2003/0085483 A1 | 5/2003 | Kroeger |
| 2008/0107764 A1 | 5/2008 | MacDonald et al. |
| 2008/0167141 A1 | 7/2008 | Cavallaro et al. |

FOREIGN PATENT DOCUMENTS

| | | | |
|---|---|---|---|
| DE | 20 2008 000 727 U1 | | 5/2008 |
| EP | 0 794 046 B1 | | 10/2002 |
| EP | 1 237 702 B1 | | 4/2004 |
| FR | 2294041 A1 | | 7/1976 |
| GB | 1337384 A | | 9/1969 |
| JP | 56093528 A | | 7/1981 |
| JP | 04-053715 | * | 2/1992 |
| JP | 7024877 A | | 1/1995 |
| WO | WO-2007/029184 A2 | | 3/2007 |
| WO | WO-2007/029184 A3 | | 3/2007 |

* cited by examiner

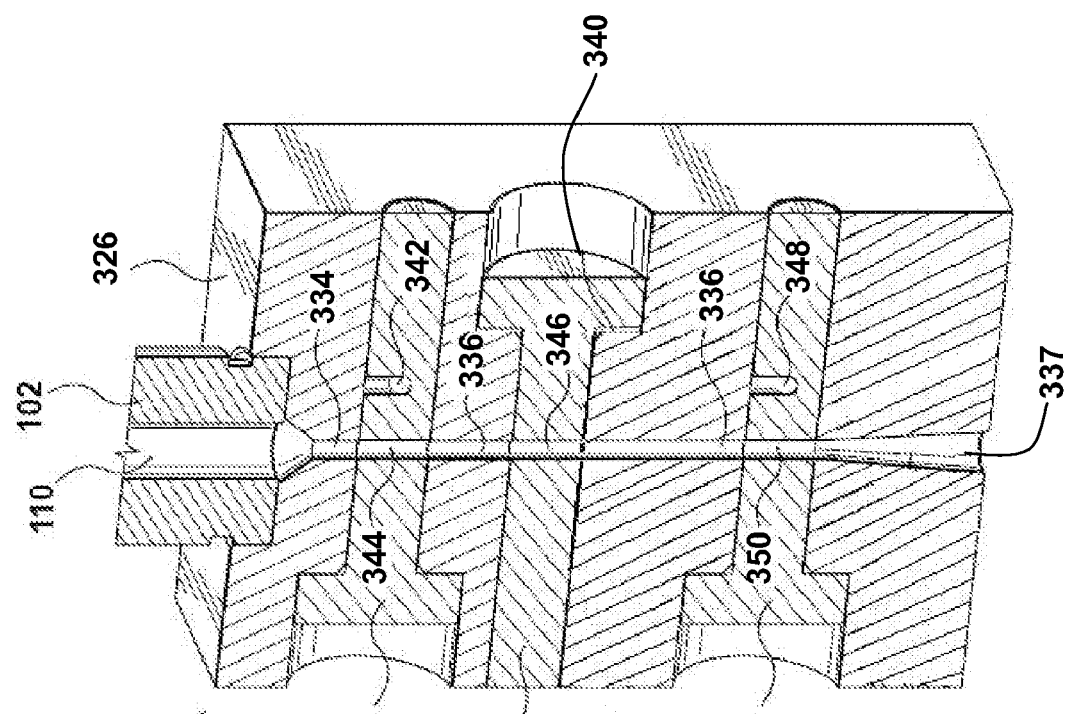
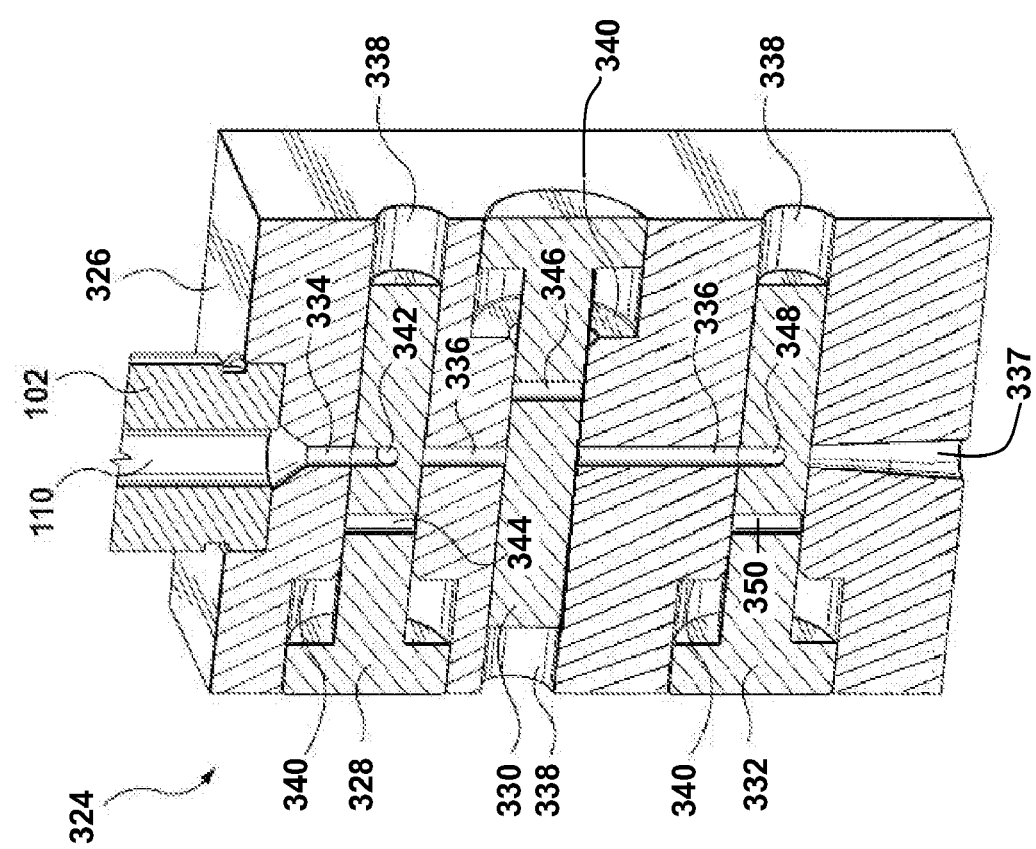

AUXILIARY INJECTION UNIT INTEGRATED IN INJECTION MOLDING SYSTEM

FIELD OF THE INVENTION

The invention relates generally to injection molding systems and more particularly to injection molding systems having an auxiliary or second injection unit for multi-material or multi-color applications.

BACKGROUND OF THE INVENTION

Multi-material and/or multi-color injection molding applications typically require an injection molding machine that has two or more injection units for delivering the two or more materials and/or colors to an injection molding system, which includes, inter alia, a hot-half, coupled to the molding machine stationary platen, generally associated with the cavity side of the injection mold, including a hot runner system having one or more injection molding manifolds and injection molding nozzles, and a cold-half, coupled to the molding machine moving platen, generally associated with the core side of the injection mold and the part ejection system. During operation, the hot-half and cold-half are urged together by the injection molding machine to define the mold cavities into which a melt steam of moldable material is injected to create a desired form. Such multi-injection unit molding machines are a significant capitol investment for molders due to the increased complexity involved in having multiple injection units associated therewith.

Auxiliary injection units have been developed that may be used with injection molding machines having a single injection unit in order to provide a means for processing the additional material and/or color required for multi-material and/or multi-color injection molding applications. Such auxiliary injection units may be attached to the injection molding machine and/or the injection molding system such that the extruder nozzle of the auxiliary injection unit, or more particularly the nozzle tip associated therewith, interfaces with the second material inlet component of the injection molding system via a carriage stroke. Such an interfacing arrangement between the auxiliary injection unit and the injection molding system permits convenient open-air purging of the auxiliary injection unit molding material when, for example, a material and/or color change is desired. However, due to the necessary force associated with the carriage stroke, in order to maintain a seal between the tip of the auxiliary injection unit nozzle and the second material inlet component during injection of the plasticized melt, bulky frames or other support mechanisms are required. As well, linkages, drive units, and controls to allow for movement of the auxiliary injection unit relative to the injection molding machine and/or the injection molding system are also required. As such, many auxiliary injection units have extra components/controls that not only make them more complex with a larger overall size and weight, but also increase the expense and maintenance cost/frequency of the units.

As such, a need exists in the art for an auxiliary injection unit that provides one or more of the following benefits: overall height and/or weight reduction, simplified extruder design, elimination of carriage stroke and associated sealing force mechanism, and/or addresses one or more of the deficiencies noted above with respect to the prior art systems.

BRIEF SUMMARY OF THE INVENTION

Embodiments hereof are directed to an injection molding apparatus having an auxiliary injection unit for producing a melt stream of moldable material that includes an extruder barrel for delivering the melt stream to an injection molding system. The injection molding system includes a melt diverter component for receiving the melt stream from the extruder barrel and delivering the melt stream to a manifold. A downstream end of the extruder barrel is secured to the melt diverter component for delivering the melt stream thereto during an injection cycle. The manifold subsequently delivers the melt stream to one or more injection molding nozzles, which are in fluid communication with a respective mold cavity. The injection molding system includes mold plates within or between which the extruder barrel, the melt diverter component, the manifold and the nozzle are at least partially positioned.

The injection molding system may include a melt discharge tube for discharging waste melt from the extruder barrel when, for example, a material and/or color change is desired. In embodiments hereof, the melt diverter component may be in fluid communication with the melt discharge tube such that waste melt to be discharged from the extruder barrel passes through the melt diverter component before entering the melt discharge tube. The melt diverter component may include a shuttle valve that is selectively positionable to provide a first melt channel through the melt diverter component that enables fluid communication between the extruder barrel and the manifold of the injection molding system, and to provide a second melt channel through the melt diverter component that provides fluid communication between the extruder barrel and the melt discharge tube when purging of molding material in the auxiliary injection unit extruder barrel is required.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 10A and 10B illustrate a triple shuttle valve arrangement in accordance with another embodiment hereof that may be used with the auxiliary injection unit and the injection molding system of FIG. 1.

DETAILED DESCRIPTION OF THE INVENTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. "Top", "bottom", "upper" and "lower" are given their customary meaning and are used with reference to a position of the injection molding system when properly installed in an injection molding machine and viewed from the operator side. Although the description of embodiments hereof is in the context of hot runner injection molding systems, the invention may also be used in other molding arrangements where it is deemed useful. Furthermore, there is no intention to be bound by any expressed or implied theory presented in the preceding technical field, background, brief summary or the following detailed description.

Figure 1:
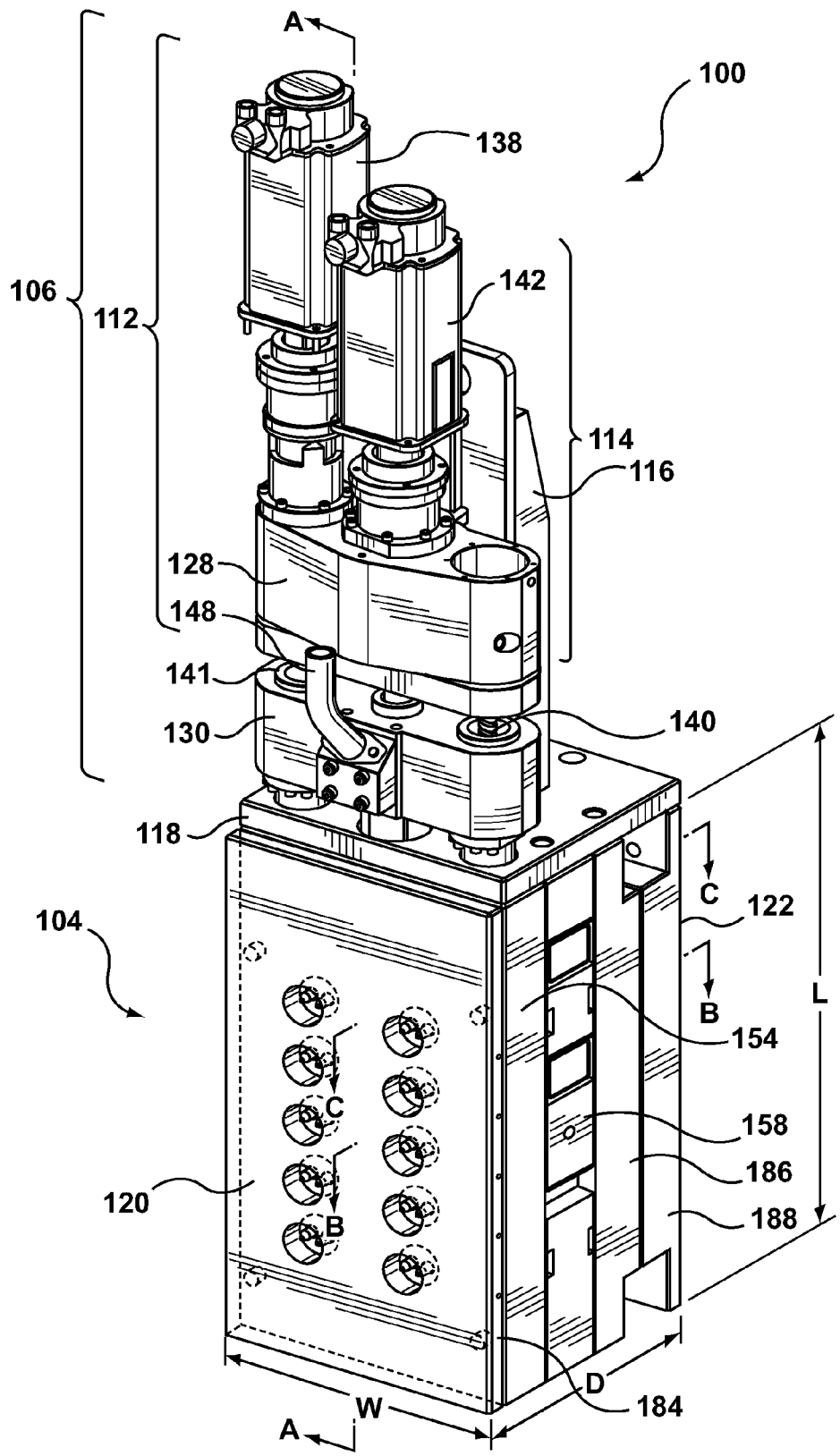
FIG. 1 is a perspective view of an auxiliary injection unit integrated with an injection molding system in accordance with an embodiment hereof.
Figure 2:
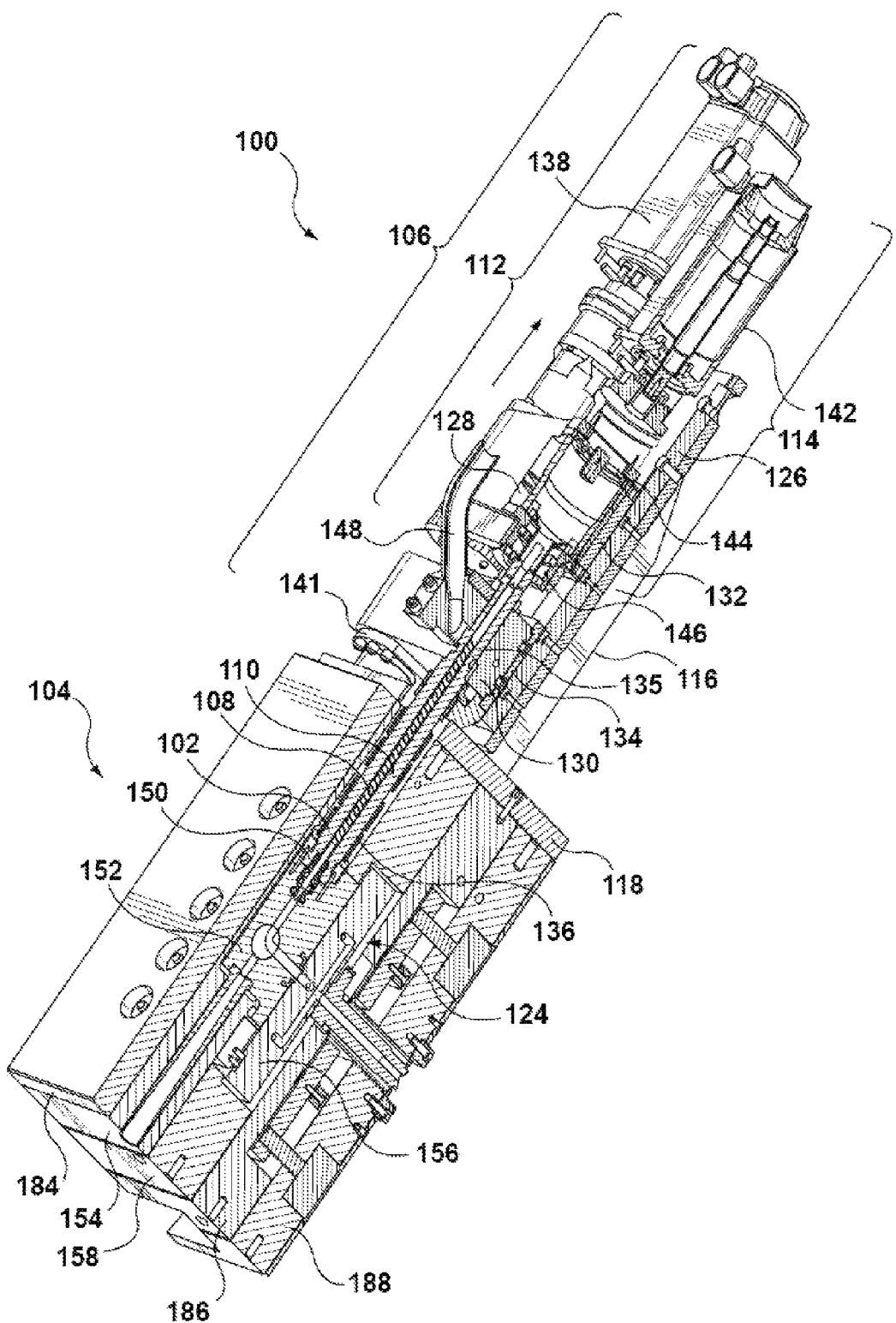
FIG. 2 is a perspective sectional view of the auxiliary injection unit and injection molding system of FIG. 1 taken along line A-A.
Figure 3:
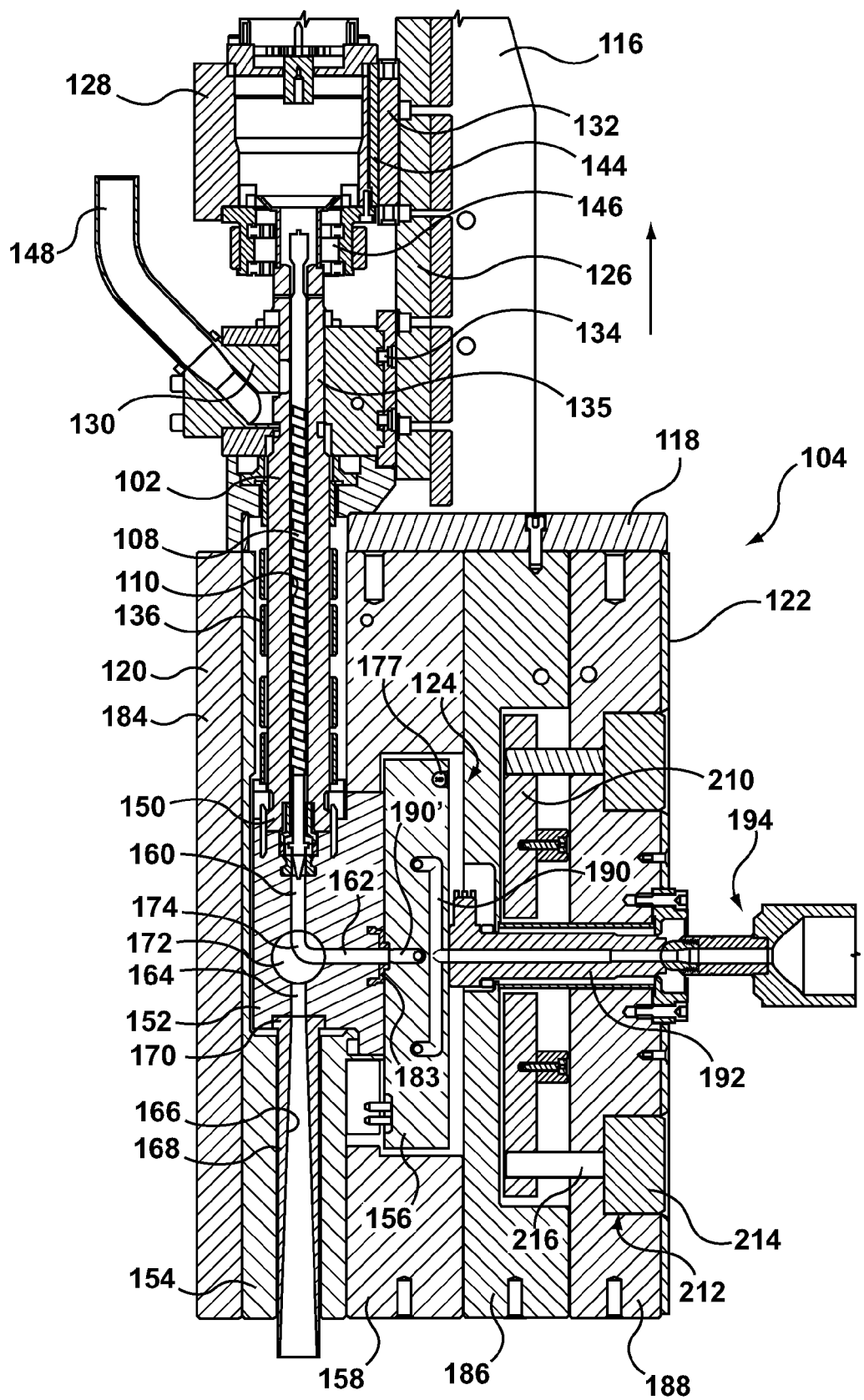
FIG. 3 is a side sectional view of a portion of the auxiliary injection unit and injection molding system of FIG. 1 taken along line A-A.

FIG. 1 is a perspective view and FIGS. 2 and 3 are sectional views of FIG. 1 taken along line A-A of an auxiliary injection unit 100 having an extruder barrel 102 integrated within the hot half of an injection molding system 104 in accordance with an embodiment hereof. An external drive assembly 106 is coupled to extruder barrel 102 to provide separate linear and rotary operation of an extruder screw 108 which is rotatably and slidably disposed within a bore 110 extending axially through extruder barrel 102. External drive assembly 106 includes a linear drive mechanism 112 and a rotary drive mechanism 114. External drive assembly 106 is attached to injection molding system 104 by a support bracket 116 that supports external drive assembly 106 against the top or upper side of injection molding system 104. Support bracket 116 is attached to a mounting plate 118 which in turn is attached to the top of injection molding system 104. Non-limiting examples of attaching either support bracket 116 to mounting plate 118, or mounting plate 118 to the top side of the injection molding system 104 include bolts or socket head cap screws. In an embodiment, mounting plate 118 is omitted and support bracket is fastened directly to the top of injection molding system 104.

In an embodiment, a width of external drive assembly 106 is less than or equal to a width W of injection molding system 104. For reference purposes, injection molding system 104 has a depth D, which includes the depths of various mold plates that hold various components of injection molding system 104, and a length L. A cavity side 120 integrates with the cavity plate (shown in phantom in FIG. 1) of injection molding system 104, and is proximate to the mold cavities (not shown). Melt inlet side, or clamping side 122 of injection molding system 104 is fastened against a stationary platen (not shown) of an injection molding machine (not shown) as would be understood by one of ordinary skill in the art.

Unlike a traditional injection barrel which interfaces with the inlet component of injection molding system via a carriage stroke, extruder barrel 102 is mechanically connected to the hot runner system 124 of injection molding system 104 as described further herein. Mounted on support bracket 116 there is a linear rail 126. An injection housing 128, also known as an extruder screw housing, and an extruder barrel housing 130 are each mounted on respective slides 132 and 134 of linear rail 126. Barrel housing 130 is fastened to the upstream end 135 of extruder barrel 102 and injection housing 128 is coupled to barrel housing 130. During operation, heat is applied to extruder barrel 102 by a plurality of band heaters 136 which causes thermal expansion of extruder barrel 102. Slides 132, 134 of linear rail 126 compensate for the thermal expansion of extruder barrel 102 by allowing both injection housing 128 and barrel housing 130 to slide/move upwards or away from injection molding system 104 on linear rail 126 in the direction of arrow ↑.

External drive assembly 106 includes a linear drive mechanism 112 such as a servo motor 138 coupled to dual ball screws 140 to rotate ball screws within respective ball nuts 141, located in barrel housing 130, to translate rotary motion of servo motor 138 into linear motion of the injection housing 128 and subsequently extruder screw 108 coupled thereto during the injection phase of the molding cycle. External drive assembly 106 also includes a rotary drive mechanism 114 such as a second servo motor 142 coupled to extruder screw 108 for rotating extruder screw 108 to plasticize the melt within bore 110 of extruder barrel 102. Rotary drive mechanism 114 includes a gearbox 144 coupled to second servo motor 142 which serves to increase the torque applied to extruder screw 108 by second servo motor 142. Injection housing 128 also contains a quill 146 that couples extruder screw 108 to rotary drive mechanism 114 while permitting axial movement of extruder screw 108.

In an embodiment servo motor 138 of linear drive mechanism 112 is replaced by at least one of a hydraulic motor coupled to the ball screws, and a linear motor and a hydraulic cylinder for actuating the extruder screw 108 during the injection phase of the molding cycle. In another embodiment, second servo motor 142 of rotary drive mechanism 114 is replaced by a hydraulic motor for rotating the extruder screw 108.

Raw polymeric pellets from an external hopper (not shown) are introduced into extruder barrel 102 via an entry chute 148 in upstream end 135 of extruder barrel 102 while extruder screw 108 is rotated, which thereby moves the pellets downstream within bore 110 and melts the pellets into a melt stream of moldable material by a combination of heat applied to extruder barrel 102 by band heaters 136 and kneading of the polymeric pellets caused by rotation of extruder screw 108. When the required shot volume is reached, rotation of extruder screw 108 is halted and extruder screw 108 is translated in a downstream direction within bore 110 by linear drive mechanism 112, described above, to inject a shot of the melt downstream into injection molding system 104 as will be explained in more detail below.

Barrel housing 130 is removably coupled to extruder barrel 102 such that external drive assembly 106 along with extruder screw 108 coupled thereto, support bracket 116 and mounting plate 118 of auxiliary injection unit 100 may be detached and removed from injection molding system 104 and extruder barrel 102. A downstream end 150 of extruder barrel 102 is removably fastened to a melt diverter component 152 that is positioned within auxiliary housing plate 154 of injection molding system 104 and is removably fastened to manifold 156. As such, a portion of the length of extruder barrel 102 is positioned between auxiliary housing plate 154 and a manifold plate 158 to extend within the hot half of the injection molding system 104. Although melt diverter component 152 is depicted as removably fastened to the upstream face of manifold 156 at or near a centerline of manifold 156, this is merely exemplary. In an embodiment melt diverter component 152 with extruder barrel 102 removably fastened thereto may be removably fastened to a surface of manifold 156 near to or away from the centerline of manifold 156 such that a substantial length of extruder barrel 102 is sunk within or between one or more mold plates of injection molding system 104 as mandated by design considerations of the particular injection molding application.

Melt diverter component 152 includes an upstream melt channel 160 for receiving melt from extruder barrel 102, and downstream melt channel 162 for delivering the melt to manifold 156 during an injection cycle. Melt diverter component 152 further includes a purge channel 164 for receiving melt from extruder barrel 102 to be diverted to a tapered discharge channel 166 of a melt discharge tube 168. Melt discharge tube 168 has an upstream end 170 attached to or sealed against melt diverter component 152 and extends from melt diverter component 152 to the bottom of injection molding system 104, and serves to discharge purged melt below injection molding system 104 during a material and/or color change of the melt being processed by auxiliary injection unit 100. As shown in FIGS. 2 and 3 at least a portion of a length of each of extruder barrel 102 and melt discharge tube 166 extends within or between one or more mold plates of injection molding system 104.

Figure 4:
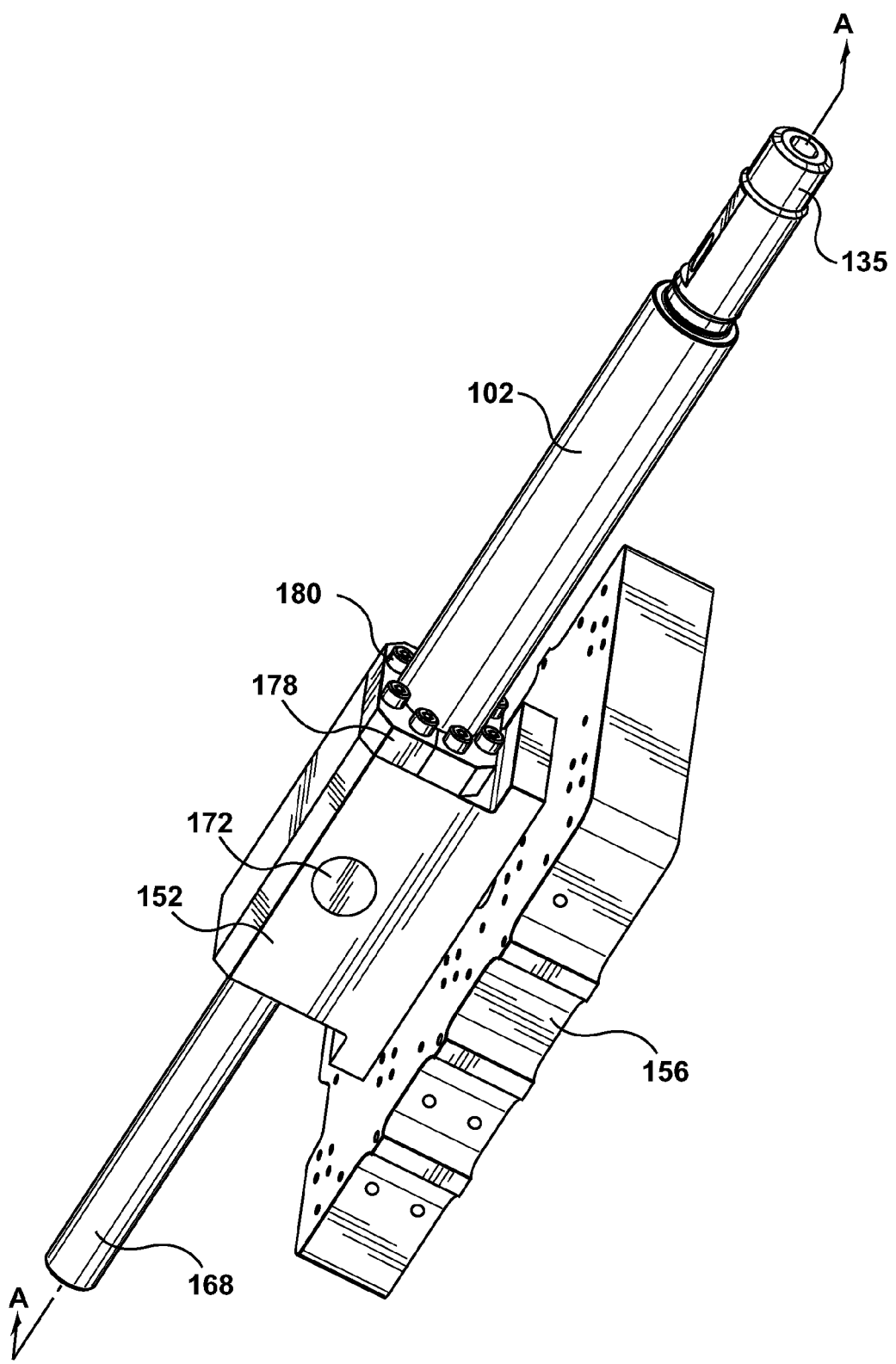
FIG. 4 is a perspective view of an extruder barrel component, a melt diverter component and a manifold component of the auxiliary injection unit and injection molding system of FIG. 1 with a remainder of the components removed for clarity.
Figure 5:
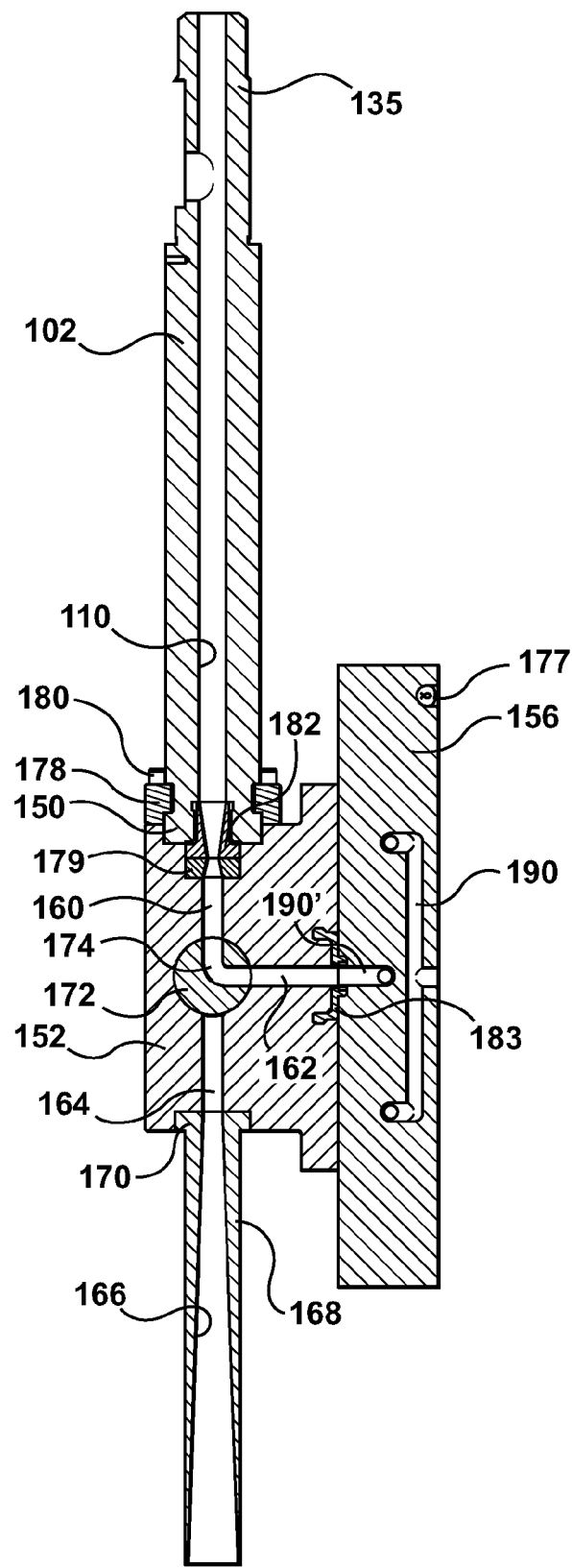
FIG. 5 is a side sectional view of the components shown in FIG. 4 taken along line A-A with a shuttle valve component in an injection configuration.
Figure 6:
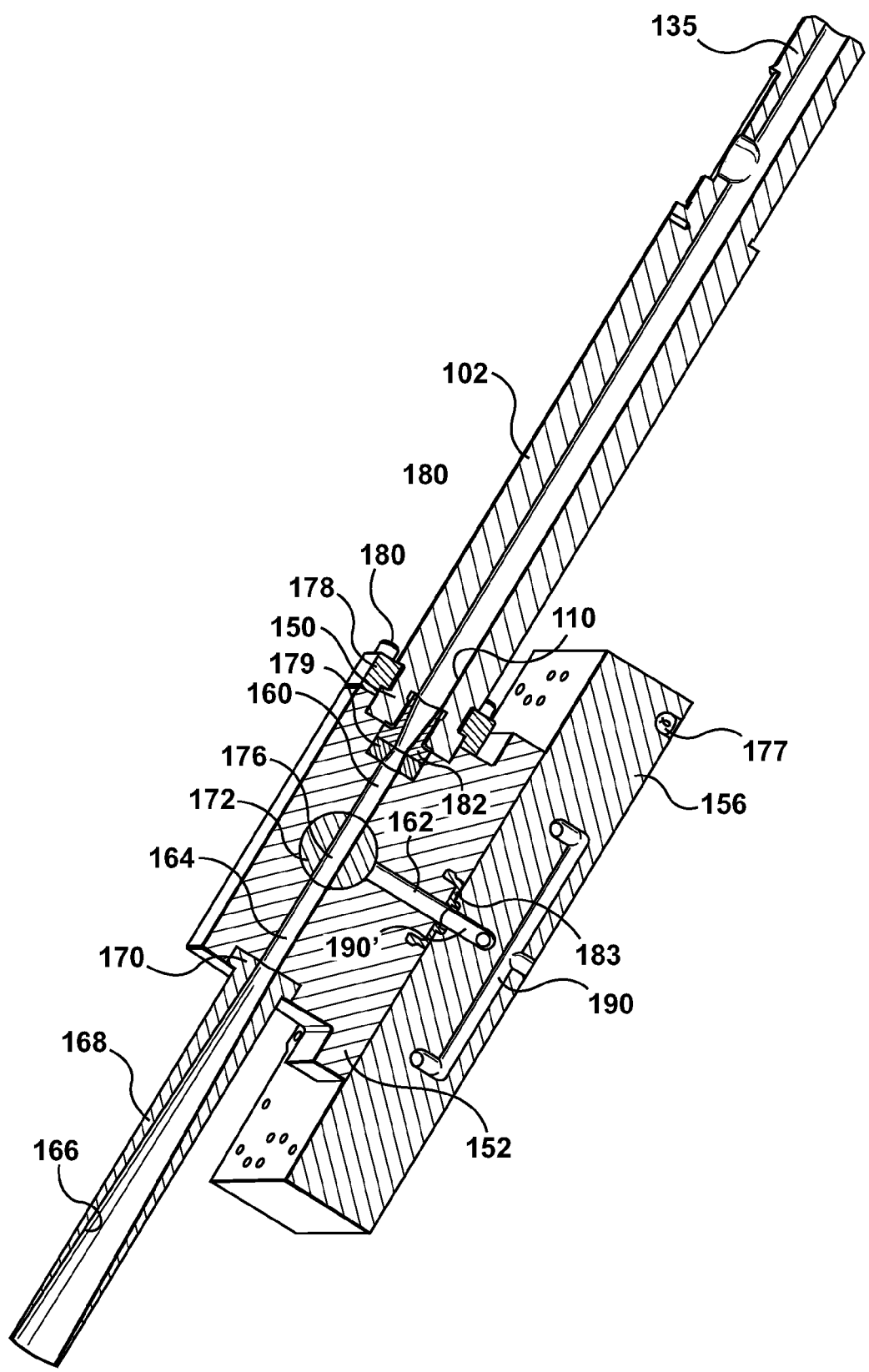
FIG. 6 is a perspective sectional view of the components shown in FIG. 4 taken along line A-A with the shuttle valve component in a purge configuration.

FIGS. 4-6 show extruder barrel 102, melt diverter component 152, manifold 156 and melt discharge tube 168 removed from the remaining components of auxiliary injection unit 100 and injection molding system 104. FIGS. 5 and 6 depict a cross section of FIG. 4 taken along line A-A.

Figure 7:
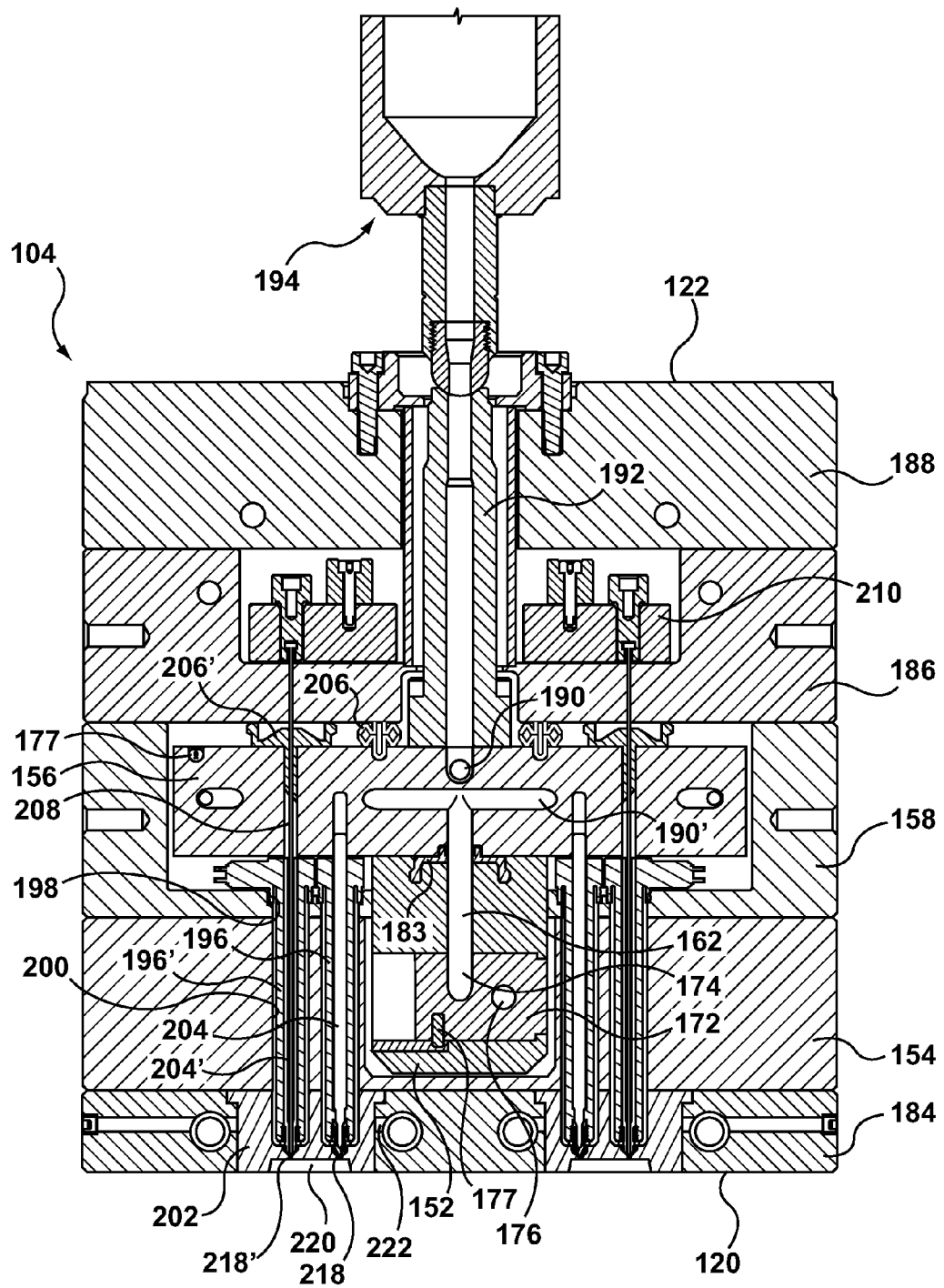
FIG. 7 is a cross-sectional view of the injection molding system of FIG. 1 taken through plane B-B and rotated 90° counterclockwise from the view in FIG. 1.

Melt diverter component 152 includes a shuttle valve 172 that is slidably disposed therein for directing melt between extruder barrel 102 and either manifold 156 or melt discharge tube 168. More particularly, shuttle valve 172 includes an elbow or L-shaped melt channel 174 for connecting upstream melt channel 160 and downstream melt channel 162 to deliver melt to manifold 156, as shown in FIG. 5. Shuttle valve also includes a straight melt channel 176 for connecting upstream melt channel 160 and purge channel 164 to divert melt to melt discharge tube 168 during a material and/or color change of the melt as shown in FIG. 6. Shuttle valve 172 may also contain additional features such as a keyed surface or other alignment feature to ensure proper rotational alignment between the shuttle valve melt channels 174, 176 and melt diverter component melt channels 160, 162, 164. A nonlimiting example of such a rotational alignment feature is shown in FIG. 7, wherein a dowel 177 is provided for in shuttle valve 172 to engage with a corresponding slot in melt diverter component 152.

In various embodiment hereof, the two-position shuttle valve 172 may be actuated manually via a lever or linkage mechanism, automatically by way of pneumatic or hydraulic actuators, or by the use of servo motors. Further, melt channels of the shuttle valve may be provided within shuttle valve such that altering between a connection between upstream melt channel 160 with either downstream channel 162 or purge channel 164 of injection molding system 104 would be facilitated by rotational movement of shuttle valve rather than the axial movement described above.

Continuing with FIGS. 4-6, a split flange component 178, secures downstream end 150 of extruder barrel 102 to melt diverter component 152 via bolts 180, while annular sealing member 179 provides a sealing force upon flanged sealing member 182 to prevent leakage of melt at the interface of extruder barrel bore 110 and upstream melt channel 160 of melt diverter component 152. Bolts or other fasteners (not shown) fasten melt diverter component 152 to manifold 156 to create a leak proof seal between downstream melt channel 162 and the secondary molding material melt channel 190'. A locating ring 183 is provided between melt diverter component 152 and manifold 156 to ensure proper alignment between downstream melt channel 162 and the inlet of secondary molding material melt channel 190'. Locating ring 183 may be made from a thermally conductive material that will create an additional seal between manifold 156 and melt diverter component 152 as a result of heat expansion.

In another embodiment, a seal is created between downstream melt channel 162 and secondary molding material melt channel 190' by an urging member such as one or more Belleville washers (not shown) or other spacer members (not shown), provided for between the melt diverter component, on the side opposite downstream melt channel 162, and auxiliary housing plate 154 such that a seal is created between downstream melt channel 162 and the secondary molding material melt channel 190' by spring force, and/or when the hot runner system is heated to a desired operating temperature.

FIG. 7 is a cross-sectional view of injection molding system 104 of FIG. 1 taken along line B-B of FIG. 1. Shuttle valve 172 is also shown in cross-section with L-shaped melt channel 174 in fluid communication with downstream melt channel 162 of melt diverter component 152 such that injection molding system 104 is in an injection configuration. Straight channel 176 of shuttle valve 172 which aligns with purge channel 164 (not visible in FIG. 7) of melt diverter component 152 is also shown not in use.

Figure 8:
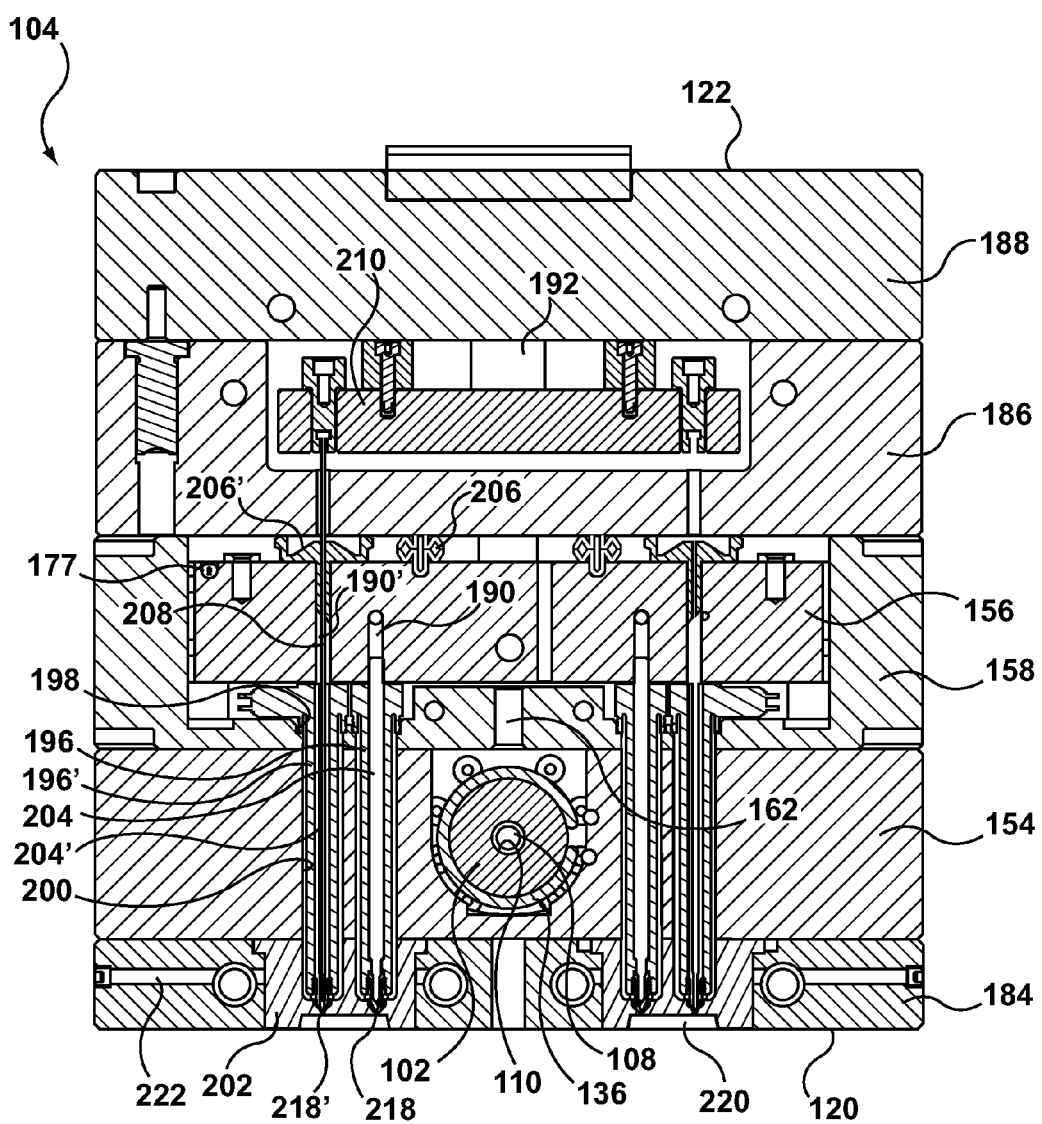
FIG. 8 is a cross-sectional view of the injection molding system of FIG. 1 taken through plane C-C and rotated 90° counterclockwise from the view in FIG. 1.

FIG. 8 is a cross-sectional view of injection molding system 104 of FIG. 1 taken along line C-C of FIG. 1. Extruder barrel 102 of auxiliary injection unit 100 is shown integrated within auxiliary housing plate 154 of injection molding system 104.

The following operation and general construction of injection molding system 104 is described with reference to FIGS. 3 and 5-8. Injection molding system 104 includes a hot half for directing melt from two separate melt sources to mold cavities which are defined by the interfacing of the hot half with the cold half. The hot half of injection molding system 104 includes a plurality of mold plates such as a cavity plate 184, auxiliary housing plate 154, manifold plate 158, manifold back plate 186 and actuator plate 188 which are aligned and fastened together by dowels (not shown) and bolts (not shown). Although each of mold plates 184, 154, 158, 186, 188, are shown as individual plates, each may consist of one or more plates depending on the particular injection molding application.

Manifold 156 is nested within or between manifold plate 158, and manifold back plate 186. Manifold 156 defines primary and secondary manifold channels 190, 190' (partially shown) and also includes a manifold heater 177 as well as a thermocouple (not shown). Primary manifold channels 190 receive a melt stream of moldable material, e.g., plastic melt, from an inlet component 192, which receives melt from an injection nozzle 194 of an injection molding machine (not shown). Secondary manifold channels 190' receive a melt stream of moldable material from auxiliary injection unit 100 coupled to melt diverter component 152 as discussed above.

Although injection molding system 104 is depicted as having a single manifold 156 with primary and secondary melt channels 190, 190' respectively, in another embodiment injection molding system 104 contains separate manifolds for primary and secondary melt channels.

Injection molding system 104 contains a plurality of thermally gated and valve gated hot runner nozzles 196, 196' located and supported in respective nozzle bores 198 and abutted against manifold 156. Nozzles 196, 196' extend through wells 200 in manifold plate 158, auxiliary housing plate 154 and into cavity inserts 202 to thermally insulate nozzles 196, 196' from mold plates 158, 154 and cavity insert 202 by providing an air space there around. Each nozzle 196, 196' defines one of a plurality of nozzle melt channels 204, 204' in fluid communication with primary and secondary manifold channels 190, 190', respectively. A plurality of manifold support members 206, 206' are provided between manifold 156 and manifold back plate 186 to provide sealing engagement between manifold 156 and nozzles 196, 196'. As is conventional, each nozzle 196, 196' includes, inter alia, a nozzle body, a nozzle heater, a thermocouple, a nozzle tip and other components as would be apparent to one of ordinary skill in the art. In addition, each valve gated nozzle 196' includes an actuatable valve pin 208, coupled to a valve pin plate 210 which in turn is coupled to actuators 212 provided for in actuator plate 188. If actuators 212 depend on a working fluid for operation, i.e., pneumatic or hydraulic types, fluid conduits (not shown) can be provided in actuator plate 188. Should actuators 212 be electric or magnetic or of some other design, electrical conduits (not shown) can be provided in actuator plate 188. Nozzles 196, 196' in combination with manifold 156 and inlet component 192 may be referred to as the hot runner system of the injection molding system 104.

Actuators 212, shown in FIG. 3, translate valve pin plate 210 between an open and closed position by linear motion, e.g., a pneumatic piston, or rotary motion, e.g., an electric screw drive. To accomplish such movement, each actuator 212 has a stationary part 214, e.g., a housing or cylinder, connected to actuator plate 188 and also has a movable part 216, e.g., a piston or part extending from the piston, connected to valve pin plate 210. The number of actuators is a design choice, and in other embodiments more or fewer actuators can be used. In FIG. 7, valve pin plate 210 is positioned such that valve pins 208 are in the closed position seated within mold gates 218', whereas in FIG. 8, valve pin plate 210 is positioned such that valve pins 208 are in the open position away from mold gates 218' such that a melt stream of moldable material can enter mold cavities 220.

Mold cavity plate 184 retains cavity inserts 202 and mates with a core plate (not shown) to define a plurality of mold cavities 220 which receive a melt stream from respective nozzles 196, 196' via mold gates 218, 218'. Mold cavity plate 184 and the core plate are cooled by a cooling fluid circulating through cooling channels 222 in order to maintain mold cavities at a temperature whereby the melt will solidify. Cooling channels may also be provided for in auxiliary housing plate 154, as well as in mold plates 158, 186, and 188. Mold cavity plate 184 and the core plate are separable along a parting line to allow ejection of molded parts from mold cavities 220.

As previously described, auxiliary injection unit 100 and injection molding system 104 may be used in an injection molding application to produce a molded part of two materials and/or colors in a manner such as described below. To start, hot-half and cold-half of injection molding system 104 are urged together by the injection molding machine (not shown) and the mold core or barrier (not shown), housed within the cold half of the mold, is in a forward position to define a first portion of each respective mold cavity 220. In an embodiment, a first melt stream of moldable material is provided from a first melt source, such as the injection nozzle 194 of an injection molding machine (not shown), via inlet component 192. Inlet component 192 is in fluid communication with the thermally gated nozzles 196 via primary manifold melt channels 190 of manifold 156 such that the first melt stream is directed to a first portion of a respective mold cavity 220 via a mold gate 218 associated with a respective nozzle 196. Once the melt material in the first portion of mold cavity 220 is substantially solidified, the mold core, or barrier (not shown), is retracted either hydraulically, pneumatically, mechanically or as otherwise disclosed in U.S. Pat. No. 7,462,314 to Feick, which is hereby incorporated by reference in its entirety, to create a void, or second portion, in each respective mold cavity 220. Actuators 212 and valve pins 208 are actuated to an open position, as depicted in FIG. 8, and a second molding material, provided by auxiliary injection unit 100, is then directed to the second portion of the mold cavity via mold gates 218' associated with respective valve gated nozzles 196' which are in fluid communication with auxiliary injection unit 100 via secondary manifold melt channels 190' and diverter component 152. Once the void or second portion of the mold cavity 220 is filled, the actuators 212 and subsequently valve pins 208 are actuated into a closed position, as depicted in FIG. 7, to block the flow of second melt. The molded part is cooled, or solidified, and the mold is then separated by the injection molding machine and the molded part is ejected. The hot-half and cold-half of injection molding system 104 are then again urged together by the injection molding machine (not shown), the mold core or barrier (not shown) is returned to a forward position to define a first portion of a respective mold cavity 220 and the molding cycle continues.

If a color or material change is required for the second molding material, shuttle valve 172 is manually or automatically, or otherwise slid into the purge position as shown in FIG. 6 such that extruder barrel 102 is in fluid communication with discharge channel 166 of melt discharge tube 168. The extruder screw 108 is then rotated, or rotated and translated within bore 110 and the remaining material within extruder barrel 102 is purged directly to atmosphere before the new color and/or new material is added to the hopper (not shown) of auxiliary injection unit 100.

In an embodiment, each first or second portion of each mold cavity is fed molding material by more than one nozzle. In another embodiment, valve gated nozzles are used to deliver a first molding material to the first portion of the mold cavity, and thermally gated nozzles are used to deliver a second molding material to a second portion of the mold cavity. In yet another embodiment, first and second portions of mold cavity 220 are both fed respective first and second materials by valve gated nozzles. In still another embodiment, first and second portions of mold cavity 220 are both fed respective first and second materials by thermally gated nozzles.

In the multi-material molding embodiment described above it should be understood that this method has been presented only as an illustration and example, and not a limitation of the type of molding application for which the present invention is intended. For example, auxiliary injection unit 100 could also be used in co-injection molding applications wherein each mold cavity receives, either sequentially or simultaneously, two or more injection molding materials to create molded articles comprised of layers of the two or more molding materials. A non-limiting example of which includes co-injection molding of Polyethylene terephthalate (PET)

preforms, wherein each preform is comprised of inner and outer layers of a primary material, such as PET, provided for by the injection unit of the injection molding machine, and one or more core layers of a secondary molding material, such as Nylon or Ethylene Vinyl Alcohol (EVOH) provided for by the auxiliary injection unit, sandwiched between the inner and outer layers of PET.

Figure 9B:
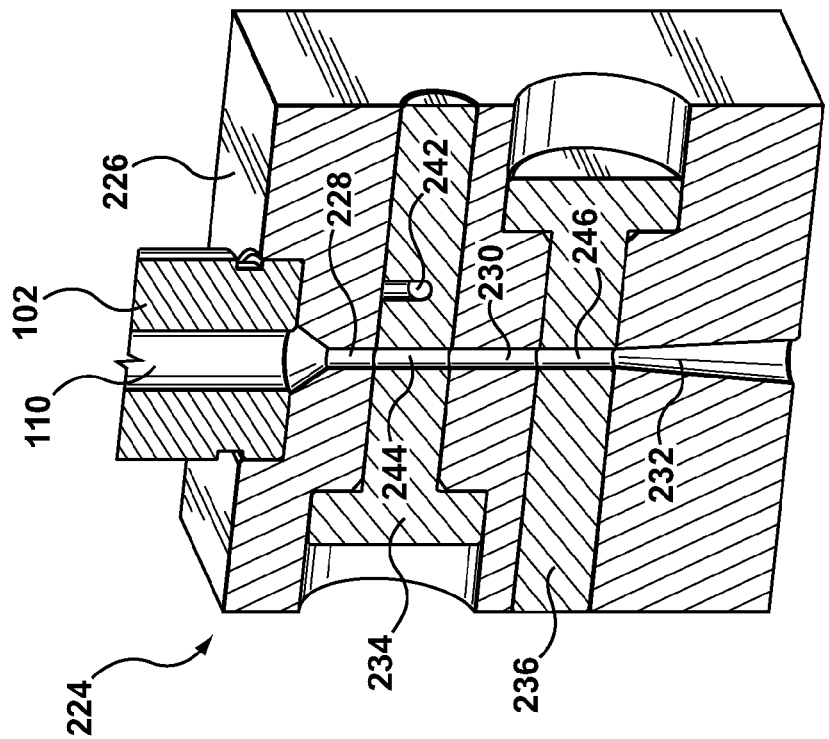
FIGS. 9A and 9B illustrate a dual shuttle valve arrangement in accordance with another embodiment hereof that may be used with the auxiliary injection unit and the injection molding system of FIG. 1.
Figure 9A:
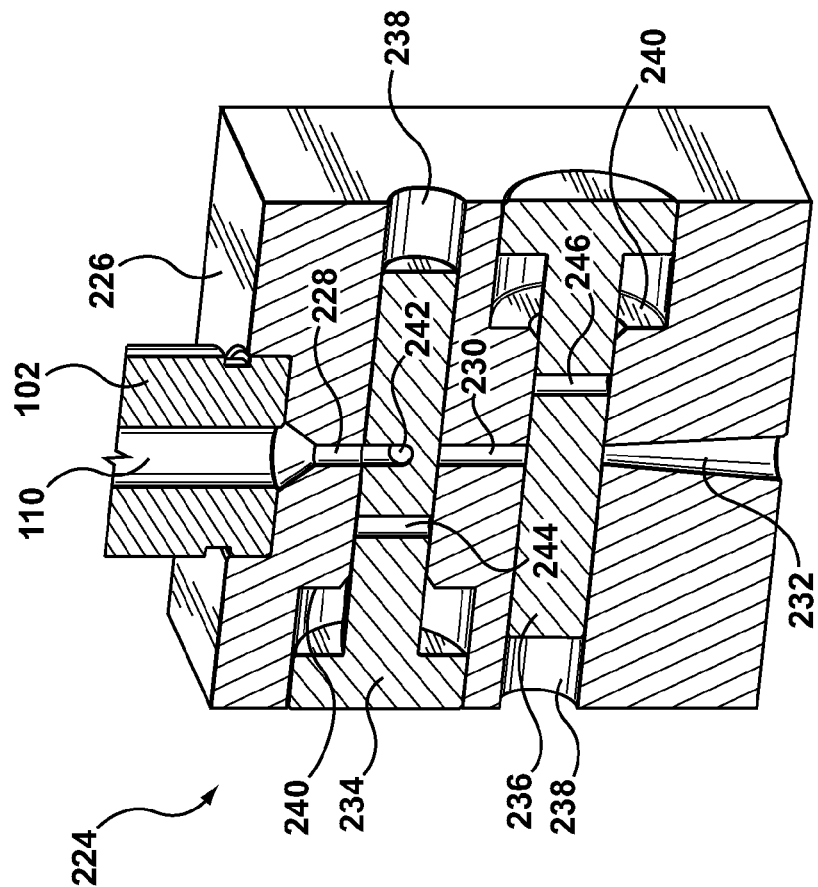

FIGS. 9A and 9B represent an alternate embodiment of a melt diverter component which may be adapted for use injection molding system 104. Features and aspects of the other embodiments may be used accordingly with the current embodiment. Dual valve melt diverter component 224 includes a diverter body 226 which defines an upstream melt channel 228 in fluid communication with bore 110 of extruder barrel 102 and a downstream melt channel (not shown) for use during injection of the melt which is also in fluid communication with bore 110 of extruder barrel 102. Diverter body 226 also defines an intermediate melt channel 230 and a purge channel 232 for use when purging material. Rather than use a single shuttle valve for directing the flow of melt between extruder barrel 102 and either the manifold or the melt discharge tube, a dual shuttle valve configuration is used for directing the flow of melt. Dual valve melt diverter component 224 includes an injection shuttle valve 234 and a purge shuttle valve 236 disposed within respective bores 238 in diverter body 226 to act against respective forward hard stops 240 and retracted hard stops (not shown). Bores 238 are sized such that injection shuttle valve 234 and purge shuttle valve 236 may slide therein when actuated between forward and retracted positions and are also sized such that a seal is created between injection shuttle valve 234, purge shuttle valve 236 and diverter body 226 to seal against a leakage of melt. In an embodiment injection shuttle valve 234 and purge shuttle valve 236 may be actuated between forward hard stops 240 and retracted hard stops (not shown) by a simple fluid driven, i.e., pneumatic or hydraulic type, two-way piston configuration, and as such fluid conduits (not shown) can be provided in diverter body 226. In another embodiment injection shuttle valve 234 and purge shuttle valve 236 may be actuated by electric or magnetic means, in which case electrical conduits (not shown) can be provided in diverter body 226.

Injection shuttle valve 234 contains an L-shaped injection channel 242 (partially shown) as well a primary purge channel 244, whereas purge shuttle valve 236 contains only a secondary purge channel 246. With reference to an injection mode of dual valve melt diverter component 224, shown in FIG. 9A, injection shuttle valve 234 is shown in a retracted position, actuated against retracted hard stops (not shown), wherein L-shaped injection channel 242 is in fluid communication with both upstream melt channel 228 and the downstream melt channel (not shown) to allow melt to flow directly from extruder barrel 102 to the manifold. During an injection mode, purge shuttle valve 236 may also actuated to a retracted position, actuated against retracted hard stops (not shown), such that secondary purge channel 246 is misaligned with melt diverter component purge channel 232 such that it creates a complete seal of the melt from atmosphere by creating a seal between intermediate melt channel 230 and purge channel 232. With reference to a purge mode of dual valve melt diverter component 224 shown in FIG. 9B, injection shuttle valve 234 and purge shuttle valve 236 are actuated to contact respective forward hard stops 240. In this position upstream melt channel 228, primary purge channel 244 of injection shuttle valve 234, intermediate melt channel 230 as well as secondary purge channel 246 of purge shuttle valve 236 are all in fluid communication with purge channel 232 to permit purging of melt to the melt discharge tube. When injection shuttle valve 234 is in purge mode as shown in FIG. 9B, L-shaped melt channel 242 is misaligned with upstream melt channel 228 to ensure the manifold is sealed-off from the melt being purged.

FIGS. 10A and 10B represent an alternate embodiment of a melt diverter component which may be adapted for use in injection molding system 104. Features and aspects of the other embodiments may be used accordingly with the current embodiment. Rather than using a single, or dual shuttle valve (s) melt diverter 152, 224 for directing the flow of melt between extruder barrel 102 and separate downstream melt channels, such as an injection channel and a purge channel, a triple shuttle valve configuration may be used in applications with more than one downstream injection channel.

Triple valve melt diverter component 324 includes a diverter body 326 a first direction injection shuttle valve 328, an intermediate shuttle valve 330 and second direction injection shuttle valve 332. Diverter body 326 defines an upstream melt channel 334 and first and second downstream melt channels (not shown). Upstream melt channel 334 is in fluid communication with bore 110 of extruder barrel 102 whereas first and second downstream melt channels (not shown) are in fluid communication with subsequent inlets on the same or separate manifolds. Diverter body 326 also defines intermediate melt channels 336 disposed upstream and downstream from intermediate shuttle valve 330 for connecting first direction injection shuttle valve 328 with second direction injection shuttle valve 332 and a purge channel 337. First direction injection shuttle valve 328, intermediate shuttle valve 330 and second direction injection shuttle valve 332 are disposed within respective bores 338 in diverter body 326 to act against respective forward hard stops 340 and retracted hard stops (not shown). Bores 338 are sized such that first direction injection shuttle valve 328, second direction injection shuttle valve 332, and intermediate shuttle valve 330 may slide therein when actuated between forward, and retracted positions and are also sized such that a seal is created between first direction injection shuttle valve 328, intermediate shuttle valve 330 and second direction injection shuttle valve 332 and diverter body 326 to seal against leakage of melt. In an embodiment first direction injection shuttle valve 328, intermediate shuttle valve 330, and second direction injection shuttle valve 332 may be actuated between forward hard stops 340 and retracted hard stops (not shown) by a simple fluid driven, i.e., pneumatic or hydraulic type, two-way piston configuration, and as such fluid conduits (not shown) can be provided in diverter body 326. In another embodiment first direction injection shuttle valve 328, intermediate shuttle valve 330, and second direction injection shuttle valve 332 may be actuated by electric or magnetic means, in which case electrical conduits (not shown) can be provided in diverter body 326.

First direction injection shuttle valve 328 contains an L-shaped injection channel 342 (partially shown) as well a connector channel 344. L-shaped injection channel 342 (partially shown) directs melt from upstream melt channel 334 to a manifold inlet channel (not shown), whereas connector channel 344 extends radially through first direction injection shuttle valve 328 for connecting upstream melt channel 334 with intermediate melt channels 336.

Intermediate shuttle valve 330 contains only one connecting melt channel 346 extending radially through intermediate shuttle valve 330 for creating a continuous flow path between intermediate melt channels 336 when intermediate shuttle valve 330 is actuated against respective hard stop 340. When intermediate shuttle valve 330 is actuated against retracted hard stop (not shown), intermediate melt channel 336 is severed.

Similar to first direction injection shuttle valve 328, second direction injection shuttle valve 332 contains an L-shaped injection channel 348 (partially shown) as well a connector channel 350. L-shaped injection channel 348 (partially shown) directs melt from intermediate melt channel 336 to the same or different manifold inlet channel (not shown) as does L-shaped injection channel 342. Second connector channel 350 extends radially through second direction injection shuttle valve 332 for connecting intermediate melt channels 336 with purge channel 337.

With reference to a first direction injection mode of triple valve melt diverter component 324, shown in FIG. 10A, first direction injection shuttle valve 328 is shown in a retracted position, actuated against retracted hard stops (not shown), wherein L-shaped injection channel 342 is in fluid communication with both upstream melt channel 334 and the downstream melt channel (not shown) to allow melt to flow directly from extruder barrel 102 to a manifold (not shown). During an injection mode, intermediate shuttle valve 330 also may be actuated to a retracted position, actuated against retracted hard stops (not shown), such that connecting melt channel 346 is misaligned with intermediate melt channels 336 and a complete seal is created preventing any melt from inadvertently travelling beyond intermediate shuttle valve 330.

Conversely, in order to direct melt to the manifold inlet channel (not shown) in fluid communication with L-shaped injection channel 348, first direction injection shuttle valve 328 and intermediate shuttle valve 330 are actuated against forward hard stops 340 and second direction injection shuttle valve 332 is actuated against a respective retracted hard stop (not shown) such that connector channel 344 and connecting melt channel 346 are aligned with intermediate melt channels 336 such that L-shaped melt channel 348 is in fluid communication with upstream melt channel 334.

With reference to a purge mode of triple valve melt diverter component 324 shown in FIG. 10B, first direction injection shuttle valve 328, intermediate shuttle valve 330 and second direction injection shuttle valve 332 are actuated to contact respective forward hard stops 340. In this position upstream melt channel 334, first connector melt channel 344, intermediate melt channels 336 and second connector melt channel 350 are all in fluid communication with purge channel 337 to permit purging of melt to the melt discharge tube (not shown). When first direction injection shuttle valve 328, intermediate shuttle valve 330 and second direction injection shuttle valve 332 are aligned in purge mode as shown in FIG. 10B, L-shaped melt channels 342, 348 are misaligned with upstream melt channel 334 and intermediate melt channels 336, to ensure respective downstream hot runner components are sealed-off from the melt being purged.

An advantage of triple valve melt diverter 324 is that is allows for melt to be injected from auxiliary injection unit 100 to first direction injection shuttle valve L-shaped melt channel 342, second direction injection shuttle valve L-shaped melt channel 348, or purge channel 337 using simple two position actuators.

As mentioned above, intermediate shuttle valve 330 is provided within diverter body 326 to create a seal between successive injection shuttle valves. In an embodiment (not shown), intermediate shuttle valves are omitted between successive injection shuttle valves.

Although FIGS. 10A and 10B depict a melt diverter component 324 for diverting material between extruder barrel 102, upstream melt channel 334, and manifold inlets in fluid communication with L-shaped melt channels 342, 348 (partially shown), this is by way of example and not limitation. In an embodiment (not shown) more than three injection shuttle valves may be provided within a diverter body. Each injection shuttle valve may include an L-shaped melt channel and a connector channel, with each L-shaped melt channel being in fluid communication with a manifold inlet and each connector channel being in fluid communication with a melt channel of a downstream injection shuttle valve, similar to first direction injection shuttle valve 328 and second direction injection shuttle valve 332 of the embodiment shown in FIGS. 10A and 10B. By increasing the number of injection shuttle valves, it is possible to direct melt to additional manifold inlets by way of various combinations of forward and refracted hard stop positions of the injection shuttle valves.

Throughout the various embodiments auxiliary injection unit 100 is shown attached to a hot runner system located in the hot-half of the injection molding system 104. In another embodiment, a primary molding material hot runner system is provided for in the hot-half of injection molding system 104, whereas a secondary molding material hot runner system and melt diverter component 152, 224, 324 are provided for within or between the plates of the cold-half of an injection molding system with the auxiliary injection unit attached thereto, and the extruder barrel extending at least partially within or between various plates of the cold half of the injection molding system. In yet another embodiment primary and secondary molding material hot runners, melt diverter component 152, 224, 324 and extruder barrel 102 are located within or between mold plates that define the cavity block of a stack mold with an auxiliary injection unit coupled thereto to inject melt either simultaneously or sequentially into one or both faces of the stack mold.

While various embodiments have been described above, it should be understood that they have been presented only as illustrations and examples of the present invention, and not by way of limitation. Although only one auxiliary injection unit is shown, more than one auxiliary injection unit could be used with an injection molding system if more than one secondary material is required by the specific molding application. Also, it should be noted that although each of the embodiments describes an auxiliary injection unit used in conjunction with a molding machine with a primary injection unit, this is also by way of illustration and not limitation. For example, auxiliary injection unit 100 can also be used as the primary injection unit in single material molding applications in a clamp-only molding machine, or in a molding machine in which the molding machine injection unit is out of service. In the stack molding application described above, using auxiliary injection unit 100 as the primary injection unit may be advantageous over traditional stack molding arrangements using the molding machine injection unit since complex melt transfer systems used to transfer the melt to the cavity block can be omitted.

It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus for use with a molding machine comprising:
    an auxiliary injection unit for producing a melt stream of moldable material, the auxiliary injection unit having an extruder barrel with an extruder screw that is rotatably and slidably disposed therein; and
    a hot half of an injection molding system having a melt diverter component for receiving the melt stream from the extruder barrel and delivering the melt stream to a manifold for providing the melt stream to an injection molding nozzle that is in fluid communication with a mold cavity, the hot half of the injection molding system having a plurality of mold plates that are fastened to each other to hold the melt diverter component, the manifold and the nozzle of the hot half,
    wherein a length of the extruder barrel of the auxiliary injection unit that contains at least a portion of the extruder screw is positioned between at least two mold plates of the plurality of fastened mold plates to extend within the hot half of the injection molding system and wherein a downstream end of the extruder barrel remains mechanically connected to the melt diverter component during and between injection cycles.

2. The injection molding apparatus of claim 1, wherein the hot half of the injection molding system further includes a melt discharge tube for discharging melt from the extruder barrel between injection cycles.

3. The injection molding system of claim 2, wherein the melt diverter component is in fluid communication with the melt discharge tube such that melt to be purged from the extruder barrel passes through the melt diverter component before entering the melt discharge tube.

4. The injection molding apparatus of claim 3, wherein the melt discharge tube is attached to the melt diverter component and at least partially positioned within one or more of the plurality of mold plates of the hot half of the injection molding system.

5. The injection molding system of claim 3, wherein the melt diverter component includes a shuttle valve that is selectively positionable to provide a first melt channel through the melt diverter component that provides fluid communication between the extruder barrel and the manifold during an injection cycle and to provide a second melt channel through the melt diverter component that provides fluid communication between the extruder barrel and the melt discharge tube between injection cycles for purging.

6. The injection molding apparatus of claim 1, wherein the auxiliary injection unit includes a drive assembly for providing rotary and linear operation of an extruder screw that is rotatably and slidably disposed within the extruder barrel.

7. The injection molding apparatus of claim 6, wherein the drive assembly is supported against an upper side of the hot half of the injection molding system by a support bracket attached to the hot half of the injection molding system.

8. The injection molding apparatus of claim 6, wherein an upstream end of the extruder barrel is removably coupled to the drive assembly.

9. The injection molding apparatus of claim 1, wherein the downstream end of the extruder barrel is mechanically connected to the melt diverter housing by a split flange component that provides a sealing force to prevent leakage of melt at the interface of the extruder barrel and the melt diverter component.

10. The injection molding apparatus of claim 1, wherein the hot half of the injection molding system includes a melt inlet component for receiving a second melt stream of moldable material from an injection nozzle of an injection molding machine.

11. An injection molding apparatus for use with a molding machine comprising:
    a hot half of an injection molding system with a plurality of mold plates fastened together to hold a hot runner system; and
    an auxiliary injection unit for producing a melt stream of moldable material and providing the melt stream to the hot half, the auxiliary injection unit having a drive assembly operably coupled to an extruder screw that is rotatably and slidably disposed within an extruder barrel,
    wherein the drive assembly is fastened to a side of the hot half with a length of the extruder barrel being positioned to extend between at least two of the plurality of fastened mold plates of the hot half with a downstream end of the extruder barrel being held between the at least two of the plurality of fastened mold plates, and wherein the extruder barrel remains fixed between the at least two of the plurality of fastened mold plates of the hot half during and between injection cycles.

12. The injection molding apparatus of claim 11, wherein the hot runner system includes a melt diverter component mechanically connected to the downstream end of the extruder barrel for receiving the melt stream therefrom.

13. The injection molding apparatus of claim 12, wherein the hot runner system includes a manifold having a melt channel for receiving the melt stream from the melt diverter component and for delivering the melt stream to one or more nozzles of the hot runner system.

14. The injection molding apparatus of claim 13, wherein a melt discharge tube is attached to the melt diverter component and at least partially positioned within one or more of the plurality of fastened mold plates of the hot half.

15. The injection molding system of claim 14, wherein the melt diverter component includes a shuttle valve that is selectively positionable to provide a first melt channel through the melt diverter component that provides fluid communication between the extruder barrel and the manifold during an injection cycle and to provide a second melt channel through the melt diverter component that provides fluid communication between the extruder barrel and the melt discharge tube between injection cycles for purging.

16. The injection molding apparatus of claim 13, wherein the hot runner system includes a melt inlet component for receiving a second melt stream of moldable material from an injection nozzle of the molding machine.

17. The injection molding apparatus of claim 11, wherein the drive assembly is removably coupled to an upstream end of the extruder barrel.

18. The injection molding apparatus of claim 11, wherein a substantial length of the extruder barrel extends between the at least two of the plurality of fastened mold plates of the hot half.

19. The injection molding apparatus of claim 11, wherein the plurality of fastened mold plates of the hot half are aligned and fastened together by dowels and bolts.

* * * * *